N. MARSHALL.
OUTLET BOX.
APPLICATION FILED JUNE 1, 1909.

984,771.

Patented Feb. 21, 1911.

Witnesses:
D. L. Gilman
H. D. McPhail

Inventor:
Norman Marshall
by
Phillips Van Everen & Fish
Attys.

UNITED STATES PATENT OFFICE.

NORMAN MARSHALL, OF NEWTON, MASSACHUSETTS, ASSIGNOR, BY MESNE ASSIGNMENTS, TO ARROW ELECTRIC COMPANY, OF HARTFORD, CONNECTICUT, A CORPORATION OF CONNECTICUT.

OUTLET-BOX.

984,771.

Specification of Letters Patent.  Patented Feb. 21, 1911.

Application filed June 1, 1909. Serial No. 499,506.

*To all whom it may concern:*

Be it known that I, NORMAN MARSHALL, a citizen of the United States, residing at Newton, in the county of Middlesex and State of Massachusetts, have invented certain new and useful Improvements in Outlet-Boxes; and I do hereby declare the following to be a full, clear, and exact description of the invention, such as will enable others skilled in the art to which it appertains to make and use the same.

The invention relates to outlet boxes such as are used in connection with interior conduit systems for electric wiring, and more especially to outlet boxes which are adapted for supporting switches, rosettes and analogous electric fittings.

One object of the invention is to provide an outlet box with connecting devices for electric fittings which will enable a variety of connections to be readily made. In accordance with this feature of the invention, the connecting device comprises a tap block having a plurality of conducting members suitably insulated, and each provided with a plurality of attaching means so arranged that line wires and fixture wires may be readily attached in a variety of combinations.

It is a further object of the invention to provide a cover for outlet boxes which may be used for different numbers and differently located leading out conductors, thereby avoiding the necessity for carrying a large variety of covers in stock, and minimizing delays.

To this end a further feature of the invention consists in providing the porcelain cover of an outlet box with a plurality of conductor holes plugged with a cement which may be broken or knocked out without injury to the porcelain, and which when removed leaves the conductor hole in such shape that there is no danger of injury to the conductor leading therethrough. With this construction the cement may be removed from any desired hole, leaving the cover otherwise intact.

A further feature of the invention consists in providing improved means for securing the porcelain cover to the outlet box.

The various features of the invention will be readily understood from an inspection of the accompanying drawings, in which an outlet box is shown embodying these features in their preferred forms.

Figure 1:
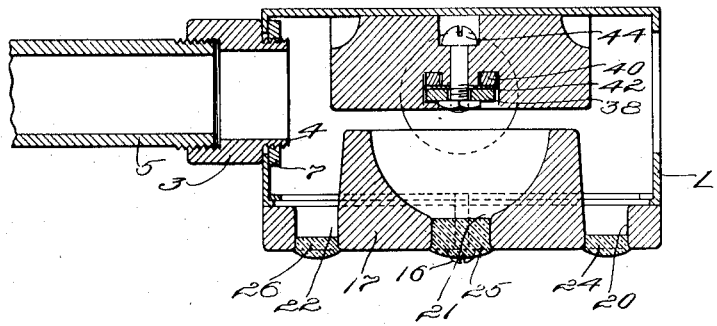
Figure 2:
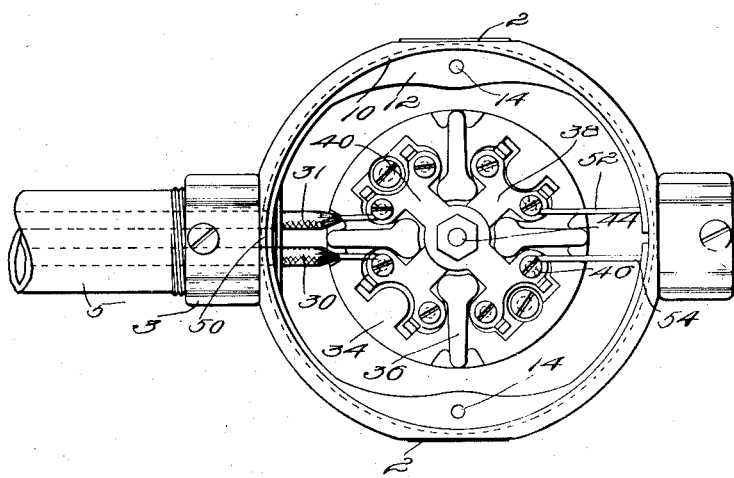
Figure 3:
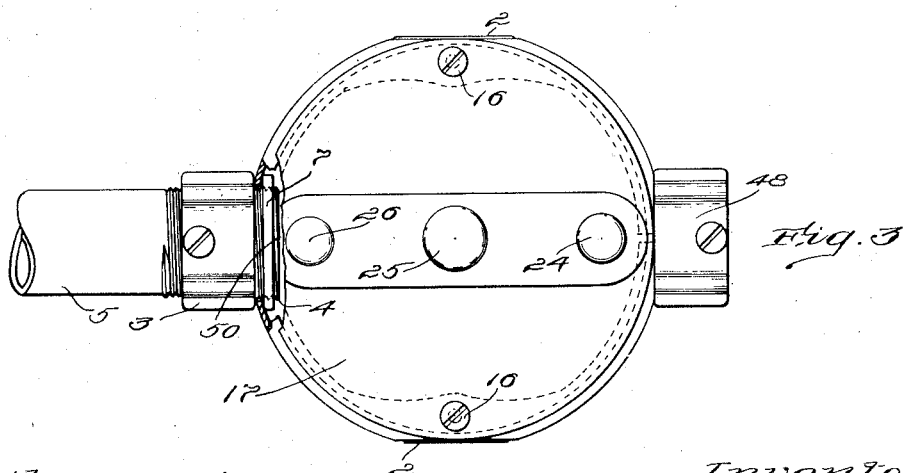

In the drawings Figure 1 is a central vertical section through the cover and box shown in Fig. 3; Fig. 2 is a bottom plan view of an outlet box with the cover removed; and Fig. 3 is a bottom plan view partially in section of a complete outlet box.

As shown in the drawings, the outlet box or pipe end consists of a casing 1 drawn up from sheet metal. A number of circular holes are formed in the wall of the box, and are closed by knock-out plugs 2, any of which may be removed to enable a connection to be made between the box and the end of a pipe in accordance with the position which the box is to occupy in the system of piping.

The means for making connection between the end of a pipe and the outlet box comprises a cylindrical nipple 3 screw-threaded for a portion of its length on its exterior at 4, and also for a portion of its interior to receive a pipe 5. A polygonal nut 7 is threaded upon the portion 4, and its facets are adapted to engage the box when the nipple is turned, thus preventing the turning of the nut, and causing the nipple to be securely fastened against the side of the box.

The upper or open face of the box is formed with an inwardly turned flange 10 which retains a split ring 12 in position within the box. The split ring is provided with screw threaded holes 14 at diametrically opposite points which are adapted to receive the screws 16 which pass through the porcelain cover 17 and hold said cover in place upon the box.

The porcelain cover 17 is provided with a plurality of conductor holes 20, 21 and 22. There are three holes shown in the present instance, but obviously the number may be varied if desired. These outlet holes are plugged with cement in the nature of sealing wax such as is used in covering metallic parts in the manufacture of electrical fixtures. The conductor holes are so shaped that when the plugs 24, 25 and 26 are molded within the holes they are firmly held within said holes, but may be readily removed when desired, yet are so firmly held that there is no danger of their accidentally dropping out. In making an installation a hole through the cover in the desired position, or the desired number of holes, may be readily formed by knocking the cement out of the desired hole or holes without injury to the porcelain.

In order to provide a convenient means for forming the electrical connections between the line wires 30 and 31 and any desired electric fixture, I provide a tap block which comprises an insulating base 34 having ribs 36 extending radially from the periphery of the base toward its center to separate at their inner ends a sufficient distance to enable the conducting plates 38 and 40 to pass therebetween. Said conducting plates are located at substantially right angles to one another, and are insulated by means of a mica washer 42 surrounding the screw 44 by which the plates are held upon the insulating base. Each plate 38 and 40 is bifurcated at each end and provided with binding posts 46 or other suitable attaching means by which the line wires or fixture wires may be secured to the contact plates. The conducting plates are held within recesses formed in the upper face of the insulating block 34, said recesses comprising two pairs which communicate with one another but are located at different levels in order to allow the conducting plates to be flat and cross one another.

By reference to Fig. 2 it will be seen that the tap block is so located in the outlet box that the conductor plates 38 and 40 extend diagonally across the same with respect to the inlet openings 48 and 50. One line wire 30 is attached to the conducting plate 38, and the line wire 31 is connected to the conducting plate 40. Wires 52 and 54 are shown connected to the conducting plates 38 and 40 respectively. These may be fixture wires or line wires, as the case may be. The line may thus be continued through the outlet box without twisting or crossing the wires, and fixture connections can be readily made with either or both ends of the conducting plates in great variety.

While I prefer to employ the specific construction shown and described in practicing the invention, it will be understood that the construction and arrangement of the parts may be varied and modified without departing from the broader features of the invention.

Having explained the nature and object of the invention, and specifically described one form of outlet box in which it may be embodied, what I claim is:—

1. The combination of an outlet box, an insulating base mounted therein, a pair of conductor bars on the base having two wire attaching devices on each end and arranged one across the other to provide four pairs of attaching devices, one of each pair being on one of the bars and the other on the other bar, substantially as described.

2. The combination of an insulating base, conductor bars 38 and 40 mounted upon the base to cross each other, two wire attaching devices on each end of each of the conductor bars, each wire attaching device on one bar being arranged adjacent to a wire attaching device on the other bar, substantially as described.

3. The combination of an insulating base provided with radial ribs extending from the periphery toward the center of the base, a pair of conductors mounted to cross each other at substantially right angles and having their ends separated by the ribs, and a pair of attaching members mounted on each end of each conductor, substantially as described.

4. The combination of an insulating base having two pairs of oppositely disposed recesses located at different levels, ribs extending radially inwardly from the periphery of the base toward the center, a pair of conducting plates crossed at substantially right angles and suitably insulated from one another, and a pair of wire attaching means on each end of each plate, substantially as described.

5. The combination of an outlet box provided with four openings for conductor wires, an insulating base within the outlet box, a pair of crossed conductor bars mounted on the base, two wire attaching devices on each end of each conductor bar so arranged that an attaching device on each bar is opposite each of the openings in the box, substantially as described.

In testimony whereof I affix my signature, in presence of two witnesses.

NORMAN MARSHALL.

Witnesses:
IRA L. FISH,
N. D. MCPHAIL.